United States Patent
Michelini et al.

(10) Patent No.: US 10,311,547 B2
(45) Date of Patent: Jun. 4, 2019

(54) IMAGE UPSCALING SYSTEM, TRAINING METHOD THEREOF, AND IMAGE UPSCALING METHOD

(71) Applicant: BOE TECHNOLOGY GROUP CO., LTD., Beijing (CN)

(72) Inventors: Pablo Navarrete Michelini, Beijing (CN); Lijie Zhang, Beijing (CN); Xiaoyu Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/741,781

(22) PCT Filed: Jun. 23, 2017

(86) PCT No.: PCT/CN2017/089742
§ 371 (c)(1),
(2) Date: Jan. 4, 2018

(87) PCT Pub. No.: WO2018/086354
PCT Pub. Date: May 17, 2018

(65) Prior Publication Data
US 2019/0005619 A1    Jan. 3, 2019

(30) Foreign Application Priority Data

Nov. 9, 2016 (CN) .......................... 2016 1 0984239

(51) Int. Cl.
*G06K 9/00*     (2006.01)
*G06T 3/40*     (2006.01)
(52) U.S. Cl.
CPC .............. *G06T 3/4046* (2013.01); *G06T 3/40* (2013.01); *G06T 3/4007* (2013.01); *G06T 3/4053* (2013.01)

(58) Field of Classification Search
CPC .................................................. G06T 3/4007
See application file for complete search history.

(56) References Cited

U.S. PATENT DOCUMENTS

2014/0093185 A1    4/2014 Liang et al.
2017/0364771 A1*  12/2017 Pinheiro ............ G06K 9/00201
(Continued)

FOREIGN PATENT DOCUMENTS

CN    104346629 A    2/2015
CN    105120130 A   12/2015
(Continued)

OTHER PUBLICATIONS

Dong. "Image Super-Resolution Using Deep Convolutional Networks" IEEE, p. 14, (Year: 2015).*
(Continued)

*Primary Examiner* — Oneal R Mistry
(74) *Attorney, Agent, or Firm* — Calfee, Halter & Griswold LLP (57) ABSTRACT

An image upscaling system includes at least two convolutional neural network modules and at least one synthesizer. The convolutional neural network module and the synthesizer are alternately connected to one another. The first convolutional neural network module receive an input image and the corresponding supplemental image, generate a first number of the feature images, and output them to the next synthesizer connected thereto. Other convolutional neural network modules each may receive the output image from the previous synthesizer and the corresponding supplemental image, generate a second number of feature images, and output them to the next synthesizer connected thereto, or output them from the image upscaling system. The synthesizer may synthesize every n*n feature images in the received feature image into one feature image and output the resultant third number of feature images to the next convo- (Continued)

lutional neural network module connected thereto or output them from the image upscaling system.

20 Claims, 5 Drawing Sheets

(56) References Cited

U.S. PATENT DOCUMENTS

| | | | |
|---|---|---|---|
| 2018/0101957 A1* | 4/2018 | Talathi | G06T 7/10 |
| 2018/0129900 A1* | 5/2018 | Kiraly | G06F 19/321 |
| 2019/0034800 A1* | 1/2019 | Shiratani | A61B 1/00 |

FOREIGN PATENT DOCUMENTS

| | | |
|---|---|---|
| CN | 204948182 U | 1/2016 |
| CN | 105611303 A | 5/2016 |

OTHER PUBLICATIONS

Ian J. Goodfellow et al., "Generative Adversarial Nets" papers.nips.cc/paper/5423-generative-adversarial-nets, 9 pages.

Written Opinion of the ISA with ISR for corresponding PCT application No. PCT/CN2017/089742 dated Sep. 27, 2017.

* cited by examiner

```
                    S710
┌──────────────────────────────┐
│ generating, by the convolutional neural │
│   network module, a first number of      │
│           feature images                 │
└──────────────────────────────┘
                │
                ▼    S720
┌──────────────────────────────┐
│ synthesizing, by the synthesizer, every │
│   n*n feature images in the received    │
│   feature image into one feature image  │
└──────────────────────────────┘
                │
                ▼    S730
┌──────────────────────────────┐
│ generating, by the next convolutional   │
│   neural network module, a second       │
│        number of feature images         │
└──────────────────────────────┘
```

Fig. 7

IMAGE UPSCALING SYSTEM, TRAINING METHOD THEREOF, AND IMAGE UPSCALING METHOD

CROSS-REFERENCE TO RELATED APPLICATIONS

The present application is based on International Application No. PCT/CN2017/089742, filed on Jun. 23, 2017, which is based upon and claims priority to Chinese Patent Application No. 201610984239.6, titled "IMAGE UPSCALING SYSTEM, TRAINING METHOD THEREOF, AND IMAGE UPSCALING METHOD", filed Nov. 9, 2016, and the entire contents thereof are incorporated herein by reference.

TECHNICAL FIELD

The present disclosure relates to the field of image processing and display technology, and more particularly, to an image upscaling system, a training method thereof, a display device and an image upscaling method.

BACKGROUND

In general, image upscaling refers to improving resolution of an original image through image processing. Currently, the image upscaling method may be interpolation-based, such as bicubic interpolation, or learning-based, such as constructing a neural network-based machine learning model for image upscaling.

At present, convolution neural network has been widely used in the field of image processing to implement image recognition, image classification and image upscaling. Convolutional neural network is a common deep learning architecture, typically includes a convolutional layer and a pooling layer. The convolutional layer is mainly used to extract features of input data. The pooling layer may reduce the dimensionality of the features by average pooling or maximum pooling.

It should be noted that, information disclosed in the above background portion is provided only for better understanding of the background of the present disclosure, and thus it may contain information that does not form the prior art known by those ordinary skilled in the art.

SUMMARY

Embodiments of the present disclosure disclose an image upscaling system, a training method thereof, a display device including the image upscaling system and a method for up-converting an image by the image upscaling system.

According to a first aspect of the present disclosure, there is provided an image upscaling system. The image upscaling system includes: at least two convolutional neural network modules; and at least one synthesizer; wherein the convolutional neural network module and the synthesizer are alternately connected to one another and the synthesizer is connected between two adjacent convolutional neural network modules. A first convolutional neural network module of the at least two convolutional neural network modules is configured to receive an input image and a supplemental image of the same resolution as the input image, generate a first number of feature images based on the input image and the supplemental image of the same resolution as the input image, and output the first number of feature images to the next synthesizer connected thereto. Each of the other convolutional neural network modules of the at least two convolutional neural network modules is configured to receive an output image from the previous synthesizer and a supplemental image of the same resolution as the received output image, generate a second number of feature images based on the output image and the supplemental image of the same resolution as the output image, and output the second number of feature images to the next synthesizer connected thereto or as output of the image upscaling system. The synthesizer is configured to synthesize every n*n feature images in the received feature images into one feature image, and output a third number of feature images synthesized to the next convolutional neural network module connected thereto or as output of the image upscaling system. In the image upscaling system, n denotes an upscaling magnification factor of the synthesizer, which is an integer greater than 1, and the number of feature images received by the synthesizer is a multiple of n*n.

In an embodiment of the present disclosure, the supplementary image is an image with a fixed distribution and white noise.

In an embodiment of the present disclosure, the upscaling magnification factor of the synthesizer is the same.

In an embodiment of the present disclosure, the upscaling magnification factor of the synthesizer is a multiple of two.

In an embodiment of the present disclosure, the synthesizer is an adaptive interpolation filter.

According to a second aspect of the present disclosure, there is provided a display device, comprising the above described image upscaling system.

According to a third aspect of the present disclosure, there is provided a method for training the above described image upscaling system. In the method, constructing a first training set comprising an original image and at least one down-converted image of the original image, wherein the down-converted image has a lower resolution than the original image. Next, constructing a second training set comprising the original image, a magnification factor, and a first degraded image of the original image based on the magnification factor, the resolution of the first degraded image having a resolution the same as the original image. Then, training the convolutional neural network system with the second training set, taking the original image and the first degraded image as input, and taking the magnification factor as output. Acquiring a parameter of the image upscaling system with the trained convolutional neural network system and the first training set. Then, constructing again a new training set comprising the original image, the magnification factor, and a second degraded image of the original image based on the magnification factor, based on the image upscaling system with the acquired parameter, the second degraded image degraded image having a resolution the same as the original image. Training again the convolutional neural network system with the new training set constructed, taking the original image and the second degraded image as input, and taking the magnification factor as output. Then, acquiring again a parameter of the image upscaling system with the trained convolutional neural network system and the first training set. Repeatedly performing the above described step of constructing a new training set, training the image upscaling system and acquiring a parameter of the image upscaling system.

In an embodiment of the present disclosure, further checking whether the parameter of the image upscaling system satisfies a predetermined condition; stopping training of the image upscaling system in response to the parameter of the image upscaling system satisfying the predetermined condition; and continuing to perform the training of the image upscaling system in response to the parameter of the image upscaling system not satisfying the predetermined condition.

In an embodiment of the present disclosure, the down-converted image may be obtained by down-sampling the original image.

In an embodiment of the present disclosure, the first degraded image may be obtained by: down-sampling the original image with the magnification factor; and then, up-sampling the down-sampled image with the magnification factor.

In an embodiment of the present disclosure, the down-sampling is performed with bi-cubic down-sampling method, and the up-sampling is performed with bi-cubic up-sampling method.

In an embodiment of the present disclosure, the convolutional neural network system is trained through a stochastic gradient descent method such that the parameter of the convolutional neural network system satisfies:

$$\theta_{opt} = \arg_\theta \min_X (f - D_\theta(X, \text{Down}_f(\text{UP}_f(X))))$$

where $\theta_{opt}$ denotes the parameter of the convolutional neural network system, f denotes the frequency multiplication factor, $D_\theta(X, \text{Down}_f(\text{Up}_f(X)))$ denotes an magnification factor estimated by the convolutional neural network system based on the original image X and the first degraded image or the second degraded image $\text{Down}_f(\text{UP}_f(X))$.

In an embodiment of the present disclosure, the convolutional neural network system is trained through a stochastic gradient descent method such that the parameter of the convolutional neural network system satisfies:

$$\alpha_{opt} = \arg_\theta \min_X \sum_k \|D_\theta(X, HR_k)\|$$

where $\alpha_{opt}$ denotes the parameter of the image upscaling system, $D_\theta(X, HR_k)$ denotes the magnification factor estimated by the trained convolutional neural network system based on the original image $HR_k$ and the upscaling image X obtained through the image upscaling system, and "$\|\cdot\|$" denotes a norm operation.

In an embodiment of the present disclosure, the second degraded image may be obtained by: down-sampling the original image with the magnification factor; and then up-converting the down-sampled image with the magnification factor by the trained image upscaling system.

In an embodiment of the present disclosure, the value of the magnification factor is different in different training sets.

In an embodiment of the present disclosure, in the first training set, the original image may be divided into a plurality of image blocks each having a first size. In the second training set and the new training set, the original image may be divided into a plurality of image blocks each having a second size.

According to a third aspect of the present disclosure, there is provided a method for up-converting an image by the above described image upscaling system according to any one of claims 1 to 5. In the method, generating, by the convolutional neural network module, a first number of feature images based on a received input image and a supplemental image of the same resolution as the input image, and outputting the first number of feature images to the synthesizer. Synthesizing, by the synthesizer, every n*n feature images in the received feature image into one feature image, and outputting the synthesized feature images to the next convolutional neural network module. Generating, by the next convolutional neural network module, a second number of feature images based on the feature image outputted by the synthesizer and the supplementary image of the same resolution as the received feature image, and outputting the second number of feature images. In the method, n denotes an upscaling magnification factor of the synthesizer, which is an integer greater than 1, and the number of feature images received by the synthesizer is a multiple of n*n.

In the image upscaling system according to the embodiment of the present disclosure, by adding the details missing from the low-resolution image, it may obtain a high-resolution image of a real effect. In addition, the image upscaling system according to the embodiment of the present disclosure may have different upscaling magnification factors, to obtain output images with different resolutions. Compared with the conventional training method using a cost function based on mean square error and the like, the training method of the image upscaling system according to the embodiment of the present disclosure may optimize the parameter of the image upscaling system and may allow random input of the image upscaling system to produce a real effect.

BRIEF DESCRIPTION OF THE DRAWINGS

To describe the technical solutions of the embodiments of the present disclosure more clearly, the accompanying drawings of the embodiments are briefly introduced in the following. Apparently, the accompanying drawings relate to only some embodiments of the present disclosure, and not to limiting the present disclosure.

DETAILED DESCRIPTION

In order to make the objectives, technical solutions and advantages of the embodiments of the present disclosure clearer, the technical solutions of the embodiments of the present disclosure will be clearly and completely described below with reference to the accompanying drawings. Apparently, the described embodiments are only a part but not all of the embodiments of the present disclosure. All other embodiments obtained by persons skilled in the art based on the described embodiments of the present disclosure without creative efforts shall also fall within the protection scope of the present disclosure.

Figure 1:
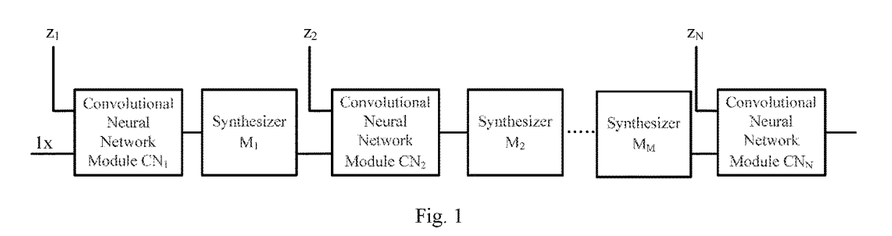
FIG. 1 is a schematic structural diagram of an image upscaling system according to an embodiment of the present disclosure.

FIG. 1 is a schematic structural diagram of an image upscaling system 100 according to an embodiment of the present disclosure. As shown in FIG. 1, the image upscaling system 100 may include a plurality of convolutional neural network modules $CN_1$, $CN_2$, ... $CN_N$ (collectively represented as CN) and at least one synthesizer $M_1$, $M_2$, ... $M_M$ (collectively represented as M), where M=N−1. The convolutional neural network modules $CN_1$, $CN_2$, ... $CN_N$ and the synthesizers $M_1$, $M_2$, ... $M_M$ are alternately connected to one another. Therefore, a synthesizer is connected between every two adjacent convolutional neural network modules. Further, in the case of multiple synthesizers, one convolutional neural network module is connected between every two adjacent synthesizers.

The convolutional neural network module $CN_1$ (corresponding to "first convolutional neural network module") may receive an input image 1x and a supplemental image $z_1$. The supplemental image $z_1$ has the same resolution as the input image and may be used to reconstruct the missing new features in the low-resolution image. The convolutional neural network module $CN_1$ generates a first number of feature images based on the received input image 1x and the supplemental image $z_1$, and outputs the first number of feature images to the next synthesizer $M_1$.

The other convolutional neural network modules $CN_2$, ... $CN_N$ may receive the output image from the previous synthesizer $M_1$, $M_2$, ... $M_M$ connected thereto and a respective supplemental image $z_1$, ... $z_N$. The supplemental images $z_2$, $z_3$, ... $z_N$ each has the same resolution as the output image of the corresponding synthesizer. Based on the received output image and supplemental image, each of the convolutional neural network modules generates a second number of feature images and outputs the second number of feature images to the next synthesizer connected thereto or generates a second number of feature images as the output of the image upscaling system 100.

Each of the synthesizers $M_1$, $M_2$, ... $M_M$ may receive the plurality of feature images outputted by the previous convolutional neural network module $CN_1$, $CN_2$, ... $CN_{N-1}$ connected thereto, and synthesize every n*n of the received feature images into one feature image, to obtain a third number of feature images having resolution multiplied by n times. Each of the synthesizers $M_1$, $M_2$, ... $M_M$ outputs the third number of synthesized feature images to the next convolutional neural network module $CN_2$, $CN_3$, ... $CN_N$ connected thereto or outputs the third number of synthesized feature images as the output of the image upscaling system 100. In this embodiment, n represents the upscaling magnification factor and is an integer greater than 1, and the number of feature images received by a synthesizer is a multiple of n*n.

Therefore, the input of the image upscaling system 100 as shown in FIG. 1 includes an input image 1x and N supplementary images $z_1$, $z_2$, ... $z_N$, and the output of the image upscaling system 100 is either the feature images outputted by a synthesizer or feature images outputted by a convolutional neural network module other than convolutional neural network module $CN_1$. In the image upscaling system 100 of the present embodiment, each convolutional neural network module may generate feature images according to the received input image or the output images of the synthesizer and the corresponding supplementary image. Since the supplemental image may be used to reconstruct missing features in the low-resolution image, the resulting feature images contain more details than the original image, which may be represented in the up-converted image. The feature image is up-converted through synthesizers. That is, the resolution of the image is multiplied by a factor of n each time the image passes through a synthesizer with a upscaling magnification factor of n. Therefore, the image upscaling system 100 may obtain images with different resolutions.

In this embodiment, the supplementary image is input as a feature of each convolutional neural network structure, and may be an image with a fixed distribution and white noise. The fixed distribution may be, for example, uniform distribution, Gaussian distribution, or the like. In addition, for a low image magnification, such as 2 times, the supplemental image may be an image related to, for example, a texture. For a high image magnification, such as 16 times, the supplemental image may be an image related to, for example, an object.

In the embodiment of the present disclosure, the plurality of synthesizers may have the same upscaling magnification factor. If the image upscaling system includes k synthesizers, the image resolution may be improved by k*n times through the image upscaling system. Further, the upscaling magnification factor may be a multiple of two.

Figure 2A:
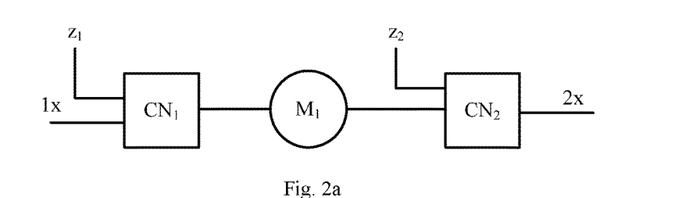
FIGS. 2a to 2c are schematic diagrams of a specific example of an image upscaling system according to an embodiment of the present disclosure.
Figure 2B:
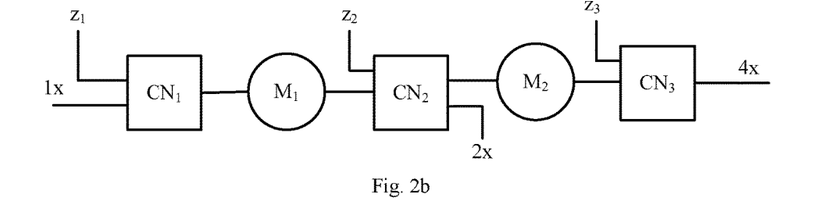
Figure 2C:
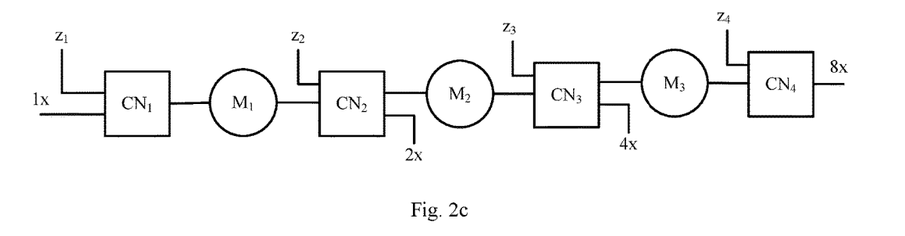

FIGS. 2a to 2c are schematic diagrams of a specific example of an image upscaling system according to an embodiment of the present disclosure. As shown in FIG. 2a, the image upscaling system of this example may include two convolutional neural network modules $CN_1$, $CN_2$ and one synthesizer $M_1$. The synthesizer $M_1$ is connected between the convolutional neural network modules $CN_1$ and $CN_2$ and has an upscaling magnification factor of 2×. Therefore, the output of the image upscaling system is an image with resolution improved by 2×times. Compared to the output image of the synthesizer $M_1$, the image outputted by the convolutional neural network module $CN_2$ has a higher image quality due to the addition of the supplemental image $z_1$. The image upscaling system as shown in FIG. 2b includes three convolutional neural network modules $CN_1$, $CN_2$, $CN_3$ and two synthesizer $M_1$ and $M_2$ each with an upscaling magnification factor of 2×. Therefore, the image upscaling system may output images with the resolution multiplied by 2× times and 4× times. The image upscaling system shown in FIG. 2c includes four convolutional neural network modules $CN_1$, $CN_2$, $CN_3$, $CN_4$ and three synthesizer $M_1$, $M_2$ and $M_3$ each with an upscaling magnification factor of 2×. Therefore, the image upscaling system may output images with the resolution multiplied by 2× times, 4× times and 8× times.

Figure 3:
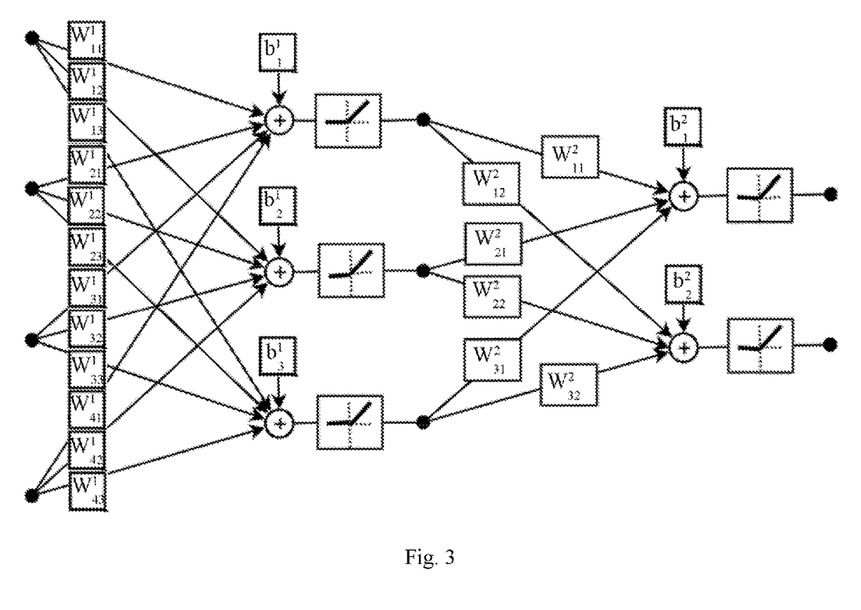
FIG. 3 is a schematic structural diagram of an example of a convolutional neural network module in the image upscaling system as shown in FIG. 1.

FIG. 3 is a schematic structural diagram of an example of a convolutional neural network module CN in the image upscaling system 100 as shown in FIG. 1. In an embodiment of the present disclosure, the convolutional neural network module CN is a convolutional neural network structure that uses images as input and output, and may include a plurality of convolution layers, each of which may include a plurality of filters. The exemplary convolutional neural network structure as shown in FIG. 3 includes two convolution layers. The input of the convolutional neural network structure is four images. After passing through the filters of the first convolution layer, three feature images are generated. Then, after passing through the filters of the second convolution layer, two feature images are generated and outputted. In this convolutional neural network structure, the filter may be, for example, a 3×3 or 5×5 kernel filter with a weight $w_{ij}^k$, where k denotes the number of the convolution layer, i denotes the number of the input image, and j denotes the number of the output image. An offset $b_i^k$ is an increment added to the convoluted output. In general, the parameters of a convolutional neural network structure are obtained by training the convolutional neural network structure using a sample set of input and output images. Training on the convolutional neural network structure will be described in detail later.

Although only a convolutional neural network structure with two layers of convolutional layers is described herein as an example, those skilled in the art should learn that a convolutional neural network structure with more layers of convolutional layers may also be used.

Figure 4:
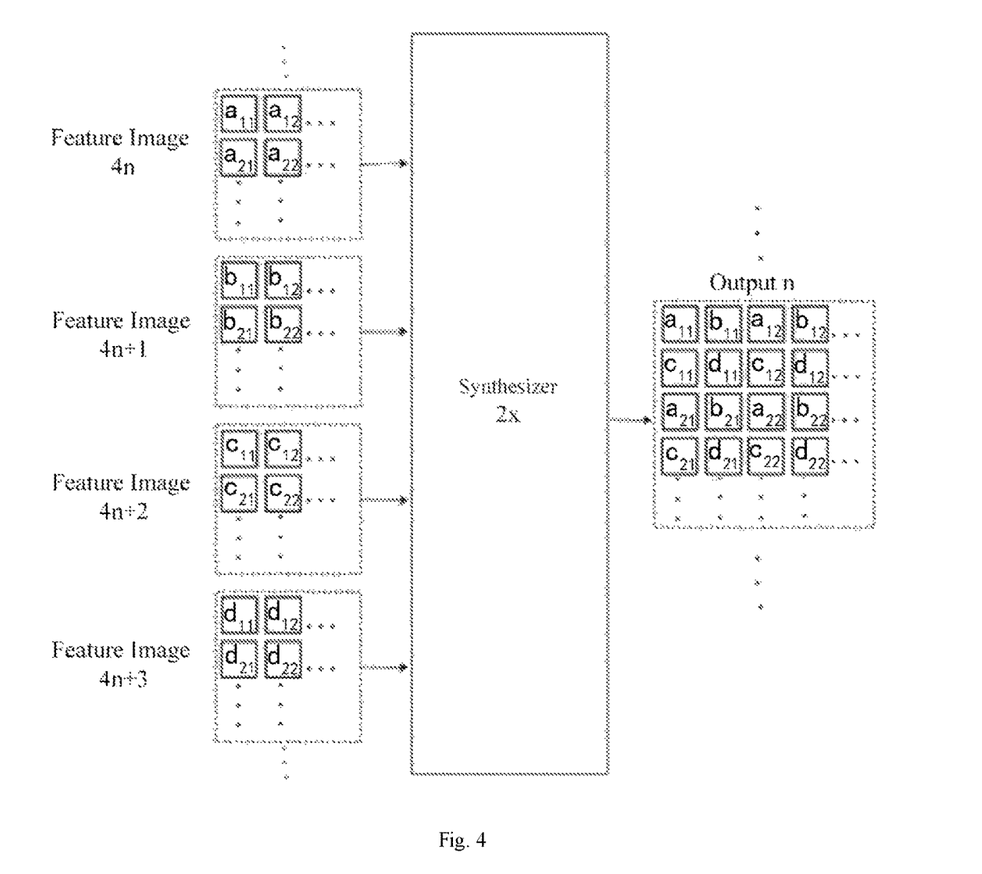
FIG. 4 is a schematic diagram for explaining upscaling processing of the synthesizer in the image upscaling system shown in FIG. 1.

In the embodiment of the present disclosure, the synthesizer M with an upscaling magnification factor of n may synthesize a number n*n of feature images into one feature image, so that the resolution of the image is magnified by n times. Therefore, the synthesizer M is substantially an adaptive interpolation filter. FIG. 4 is a schematic diagram for explaining upscaling processing of the synthesizer M in the image upscaling system 100 as shown in FIG. 1. As shown in FIG. 4, the upscaling magnification factor of the synthesizer M is 2, represented by 2× in the figure. As shown in FIG. 4, the synthesizer M synthesizes every four feature images as a group. For example, the synthesizer M synthesizes four groups of feature images: feature images $4n$, feature images $4n+1$, feature images $4n+2$, and feature images $4n+3$. Specifically, the synthesizer M arranges pixel values at the same position in the four feature image groups in a matrix, to generate a feature image having 4 times of pixels. In this way, during the process of image upscaling the pixel information in the feature image will not be modified (added or lost).

The image upscaling system according to an embodiment of the present disclosure may be implemented using hardware, software, or a combination of hardware and software.

When the image upscaling system is running, the parameters of the convolutional neural network modules included in the image upscaling system are fixed. Therefore, before running, the image upscaling system may be trained to determine the parameters of the convolutional neural network modules. The image upscaling system of the embodiment of the present disclosure also has a supplementary image as an input, while the exiting training method will eliminate all the supplementary images and thus prevent the supplementary image from affecting the output. Therefore, an embodiment of the present disclosure provides a novel training method, in which a new system (hereinafter referred to as "authentication system") is trained as a target function of the image upscaling system. The authentication system takes as input two images with the same resolution, one of the input images is an original high quality image, and another is a degraded image of the original high quality image. The degraded image is obtained by firstly down-sampling the original high quality image with a factor, and then up-sampling the down-sampled image to the original resolution. The output of the authentication system is a prediction of the magnification factor. The authentication system may be implemented using a convolutional neural network system.

During the training, the authentication system and the image upscaling system may be alternately trained. Firstly, the authentication system learns from a standard up-converter (e.g., a bi-cubic up-converter). The image upscaling system then minimizes the magnification factor estimated by the authentication system. Then, the authentication system learns based on a newly improved image upscaling system. Then, the image upscaling system once again minimizes the magnification factor of the newly improved authentication system. The training method according to the embodiment of the present disclosure allows the authentication system and the image upscaling system to be improved as "adversary" networks based on the better results of each other.

Compared to the existing training method, the training method according to the embodiment of the present disclosure uses the predicted magnification factor of the authentication system as a cost function to optimize the parameter of the image upscaling system, and may allow the input supplemental image to facilitate producing more realistic effect. In addition, by estimating the magnification factor of the authentication system may also fully explain the performance of the image upscaling system.

Figure 5:
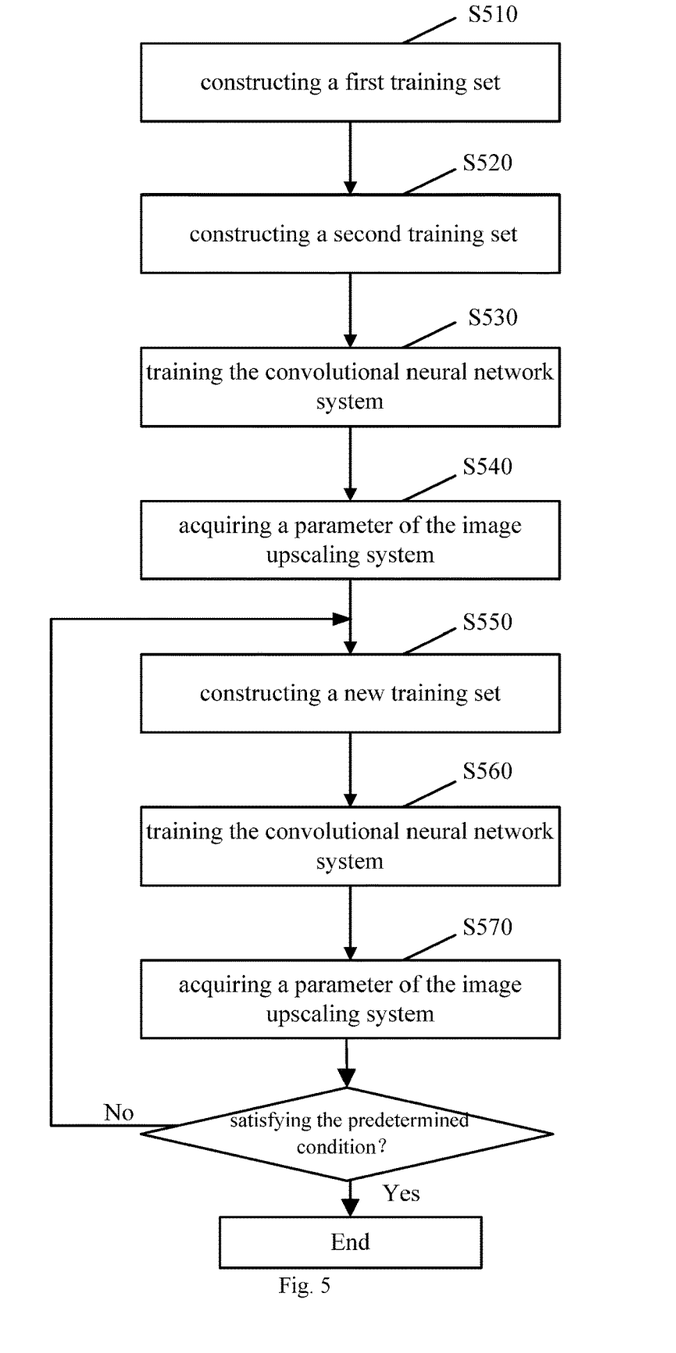
FIG. 5 is a schematic flow chart of a method for training the image upscaling system as shown in FIG. 1 according to an embodiment of the present disclosure.

The method for training the image upscaling system according to the embodiment of the present disclosure will be described in detail below with reference to the accompanying drawings. FIG. 5 is a schematic flow chart of a method for training the image upscaling system as shown in FIG. 1 according to an embodiment of the present disclosure. In the embodiment of the present disclosure, the parameter of the authentication system and the parameter of the image upscaling system are obtained by alternately performing optimization on the authentication system and the image upscaling system. The authentication system may be implemented as a convolution neural network system.

As shown in FIG. 5, in step S510, a first training set $B=\{HR_0(k), HR_1(k), \ldots, HR_{N-1}(k), HR_N(k)\}$ is constructed, where $k=1, 2, \ldots$. The first training set may include the original image $HR_N(k)$ and at least one down-converted image $HR_0(k), HR_1(k), \ldots, HR_{N-1}(k)$ of the original image $HR_N(k)$. In the embodiment of the present disclosure, the down-converted image refers to an image with a resolution lower than that of the original image. For example, assuming that the original image has a resolution of 8×, the down-converted image may have a resolution of 4×, 2× or 1×. The down-converted image may be obtained by performing a standard down-sampling (such as bi-cubic down-sampling) on the original image.

In the embodiment of the present disclosure, the original image may be one or more, that is, k is a positive integer. Further, the original image may be divided into a plurality of image blocks each having a first size.

Next, in step S520, a second training set $A_0=\{HR_N(k), f_k, Y(k)\}$ is constructed. The second training set may include the original image $HR_N(k)$, the magnification factor $f_k$ and a first degraded image $Y(k)$ of the original image $HR_N(k)$ based on the magnification factor $f_k$. In the embodiment of the present disclosure, the first degraded image has the same resolution as the original image. The first degraded image may be obtained by firstly down-sampling the original image with the magnification factor and then up-sampling the down-sampled image with the same magnification factor. Down-sampling and up-sampling may be performed with standard algorithms. For example, down-sampling may be performed with bi-cubic down-sampling method, and up-sampling may be performed with bi-cubic up-sampling method. In this step, the magnification factor may be a floating-point number, and may be randomly generated.

In the second training set, the original image may be divided into a plurality of image blocks each having a second size. The second size and the first size are different.

Figure 6:
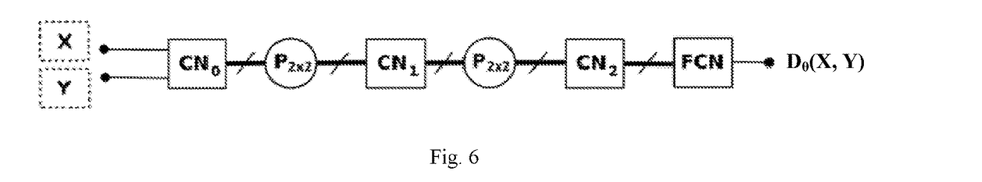
FIG. 6 is a schematic structural diagram of a convolutional neural network system for training.

Then, in step S530, the convolutional neural network system is trained with the constructed second training set $A_0$, taking the original image and the first degraded image as input, and taking a magnification factor as output. FIG. 6 is a schematic structural diagram of a convolutional neural network system for training. As shown in FIG. 6, the convolutional neural network system may include a plurality of convolutional neural network modules $CN_k$ (3 modules are exemplarily shown in the figure, k=1, 2, 3), a standard maximum pooling layer P and a fully connected network FCN. The convolutional neural network system has two inputs: the original image X and the degraded image Y of the original image X. The degraded image Y may be obtained by firstly sampling the original image with a magnification factor, and then up-sampling the down-sampled image with the same magnification factor. That is, Y=Down$_f$(UP$_f$(X)). The output of the convolutional neural network system is a prediction of the magnification factor f, denoted by D$_\theta$(X, Y), where θ represents all the parameters of the convolutional neural network system, including the parameter of the convolutional neural network module CN$_k$ and the parameter of the fully connected network FCN.

In an embodiment of the present disclosure, the convolutional neural network system is trained through a Stochastic Gradient Descent method. Firstly, a parameter of the convolutional neural network system is initialized. Then, taking the original image and the first degraded image in the second training set A$_0$ as the input of the convolutional neural network system, and taking a magnification factor as output of the convolutional neural network system, the parameter of the convolutional neural network system is adjusted, such that the parameter of the convolutional neural network system satisfies the following equation:

$$\theta_{opt}=\arg\theta\min_X(f-D_\theta(X,\text{Down}_f(\text{UP}_f(X)))) \quad (1)$$

where $\theta_{opt}$ denotes the parameter of the convolutional neural network system, f denotes the frequency multiplication factor, D$_\theta$(X, Down$_f$(Up$_f$(X))) denotes an magnification factor estimated by the convolutional neural network system based on the original image X and the first degraded image Down$_f$(UP$_f$(X)). Equation (1) shows that the parameter of the convolutional neural network system is a parameter that minimizes the difference between the real magnification factor and the estimated magnification factor.

After the parameter of the convolutional neural network system is obtained in step S530, in step S540, the parameter of the image upscaling system is obtained using the trained convolutional neural network system and the first training set B constructed in step S510. In an embodiment of the present disclosure, the parameter of the image upscaling system is obtained through the Stochastic Gradient Descent method. Firstly, the parameter of the image upscaling system is initialized. Then, an up-converted image is obtained by the image upscaling system with the down-converted image in the first training set B. Then, with the trained convolutional neural network system, taking the obtained up-converted image and the original image as input, the corresponding magnification factor is estimated. The parameter of the image upscaling system is adjusted to satisfy the following equation:

$$\alpha_{opt}=\arg\theta\min_X \sum_k \|D_\theta(X, HR_k)\| \quad (2)$$

Where $\alpha_{opt}$ denotes the parameter of the image upscaling system, D$_\theta$(X, HR$_k$) denotes the magnification factor estimated by the trained convolutional neural network system based on the original image HR$_k$ and the up-converted image X obtained through the image upscaling system, and "∥•∥" denotes a norm operation. Equation (2) shows that the parameter of the image upscaling system is a parameter that makes the output of the image upscaling system have a minimum value with respect to the input.

Then, in step S550, a new training set A$_1$=({HR$_N$(k), f$_k'$, Y'(k)} is constructed based on the parameter of the image upscaling system obtained in step S540. The new training set may include the original image HR$_N$(k), a magnification factor f$_k'$ and a second degraded image Y'(k) based on the magnification factor f$_k'$ and the original image HR$_N$(k). In an embodiment of the present disclosure, the second degraded image also has the same resolution as the original image. The second degraded image may be obtained by firstly down-sampling the original image with the magnification factor and then up-sampling the down-sampled image with the same magnification factor. For example, down-sampling may be performed with bi-cubic down-sampling method, and up-sampling may be performed with bi-cubic up-sampling method. In this step, the magnification factor may be a floating-point number, and may be randomly generated.

In step S560, the convolutional neural network system is trained with the newly constructed training set A$_1$ in step S550, taking the original image and the first degraded image as input, and taking a magnification factor as output. The training method in this step is the same as the training method in step S530. Through step S560, the parameter of the convolutional neural network may be obtained again. Then, in step S570, the parameter of the image upscaling system is obtained again, with the convolutional neural network trained in step S560 and the first training set B. The training method in this step is the same as the training method in step S540.

Then, it is checked whether a predetermined condition is satisfied. The predetermined condition may be a predetermined number of times or a condition to be met by the parameter of the image upscaling system. If not satisfied, the above steps S550 to S570 are repeatedly performed. If satisfied, the training process finishes.

Figure 7:
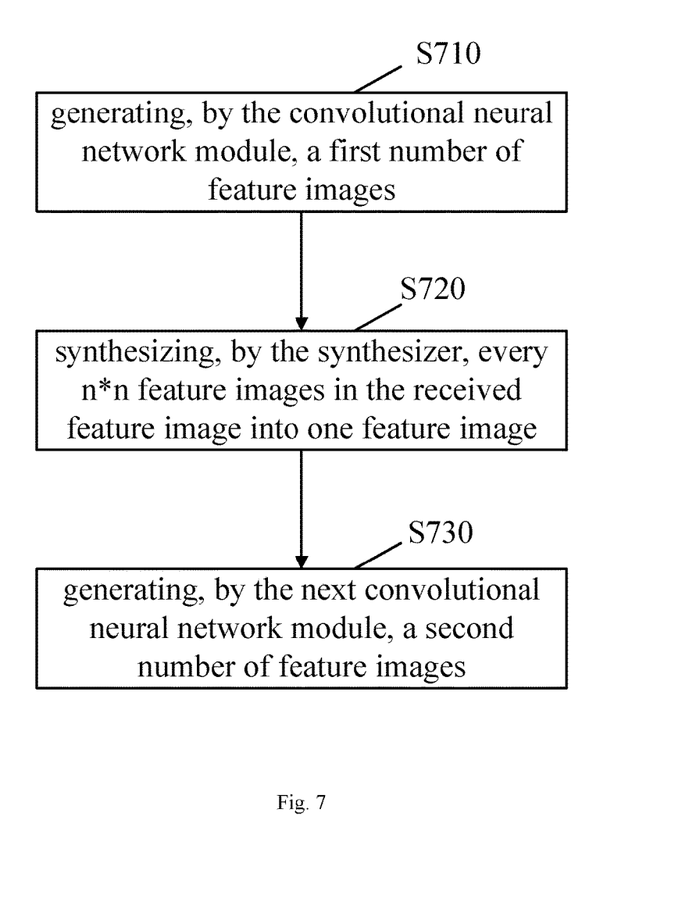
FIG. 7 is a schematic flowchart of a method for up-converting an image by the image upscaling system as shown in FIG. 1 according to an embodiment of the present disclosure.

Under the same inventive concept, FIG. 7 is a schematic flowchart of a method for up-converting an image by the image upscaling system as shown in FIG. 1 according to an embodiment of the present disclosure. As shown in FIG. 7, in step S710, the convolutional neural network module generates a first number of feature images based on a received input image and a supplemental image having the same resolution as the input image, and outputs the feature images to the synthesizer. Next, in step S720, the synthesizer synthesizes every n*n feature images in the received feature images into one feature image, and outputs the synthesized feature images to the next convolutional neural network module. Then, in step S730, the next convolutional neural network module generates a second number of feature images based on the feature images outputted by the synthesizer and a supplemental image having the same resolution as the received feature images, and outputs the second number of feature images. Depending on the number of synthesizers contained in the image upscaling system, output images with different resolutions may be obtained.

An embodiment of the present disclosure further provides a display device, which includes an image upscaling system according to an embodiment of the present disclosure. The display device may be, for example, a display, a mobile phone, a laptop computer, a tablet computer, a television set, a digital photo frame, a wearable device, a navigation device, or the like.

While certain embodiments of the present disclosure have been described in detail, apparently, those skilled in the art may make various modifications and changes to the embodiments of the present disclosure without departing from the spirit or scope of the present disclosure. The scope of the present disclosure is defined by the appended claims.

What is claimed is:

1. An image upscaling system comprising:
a first convolutional neural network module;
a second convolutional neural network module; and
at least one synthesizer;
wherein the first convolutional neural network module and the synthesizer are alternately connected to one another and the synthesizer is connected between the first convolutional neural network module and the second convolutional neural network module;
the first convolutional neural network module is configured to: receive an input image and a first supplemental image having a same resolution as the input image, to generate a first number of feature images based on the input image and the first supplemental image, and to output the first number of feature images to the synthesizer connected thereto;
the second convolutional neural network module is configured to: receive an output image from the synthesizer and a second supplemental image having a the same resolution as the received output image, to generate a second number of feature images based on the output image from the synthesizer and the second supplemental image, and is operable to output the second number of feature images to one of: a next synthesizer connected thereto or an output of the image upscaling system;
wherein the synthesizer is configured to synthesize every n*n feature images in the received feature images into one feature image, and to output a third number of feature images synthesized to one of: the second convolutional neural network module connected thereto or as an output of the image upscaling system; and
wherein n denotes an upscaling magnification factor of the synthesizer, which is an integer greater than 1, and the number of feature images received by the synthesizer is a multiple of n*n.

2. The image upscaling system according to claim 1, wherein the supplementary image is an image with a fixed distribution and white noise.

3. The image upscaling system according to claim 1, wherein the upscaling magnification factor of the synthesizer is the same.

4. The image upscaling system according to claim 1, wherein the upscaling magnification factor of the synthesizer is a multiple of two.

5. The image upscaling system according to claim 1, wherein the synthesizer is an adaptive interpolation filter.

6. A display device, comprising the image upscaling system according to claim 1.

7. A method for training the image upscaling system according to claim 1, comprising:
constructing a first training set comprising an original image and at least one down-converted image of the original image, wherein the down-converted image has a lower resolution than the original image;
constructing a second training set comprising the original image, a magnification factor, and a first degraded image of the original image based on the magnification factor, wherein the first degraded image has the same resolution as the resolution of the original image;
training the convolutional neural network system with the second training set, taking the original image and the first degraded image as input, and taking the magnification factor as output;
acquiring a parameter of the image upscaling system with the trained convolutional neural network system and the first training set;
constructing a new training set comprising the original image, the magnification factor, and a second degraded image of the original image based on the magnification factor, based on the image upscaling system with the acquired parameter, wherein the second degraded image degraded image has a resolution the same as the original image;
training the convolutional neural network system with the new training set, taking the original image and the second degraded image as input, and taking the magnification factor as output;
acquiring again a parameter of the image upscaling system with the trained convolutional neural network system and the first training set; and
repeatedly performing the step of constructing a new training set, training the image upscaling system and acquiring a parameter of the image upscaling system.

8. The method according to claim 7, further comprising:
checking whether the parameter of the image upscaling system satisfies a predetermined condition;
stopping training of the image upscaling system in response to the parameter of the image upscaling system satisfying the predetermined condition; and
continuing to perform the training of the image upscaling system in response to the parameter of the image upscaling system not satisfying the predetermined condition.

9. The method according to claim 7, wherein the down-converted image is obtained by down-sampling the original image.

10. The method according to claim 7, wherein the first degraded image is obtained by:
down-sampling the original image with the magnification factor; and
up-sampling the down-sampled image with the magnification factor.

11. The method according to claim 10, wherein the down-sampling is performed with bi-cubic down-sampling method, and the up-sampling is performed with bi-cubic up-sampling method.

12. The method according to claim 7, wherein the convolutional neural network system is trained through a stochastic gradient descent method such that the parameter of the convolutional neural network system satisfies:

$$\theta_{opt} = \arg_\theta \min_X (f - D_\theta(X, \text{Down}_f(\text{UP}_f(X))))$$

where $\theta_{opt}$ denotes the parameter of the convolutional neural network system, f denotes the frequency multiplication factor, $D_\theta(X, \text{Down}_f(\text{Up}_f(X)))$ denotes an magnification factor estimated by the convolutional neural network system based on the original image X and the first degraded image or the second degraded image $\text{Down}_f(\text{UP}_f(X))$.

13. The method according to claim 7, wherein the convolutional neural network system is trained through a stochastic gradient descent method such that the parameter of the convolutional neural network system satisfies:

$$\alpha_{opt} = \arg_\theta \min_X \sum_k \|D_\theta(X, HR_k)\|$$

where $\alpha_{opt}$ denotes the parameter of the image upscaling system, $D_\theta(X, HR_k)$ denotes the magnification factor estimated by the trained convolutional neural network system based on the original image $HR_k$ and the upscaling image X obtained through the image upscaling system, and "$\|\cdot\|$" denotes a norm operation.

14. The method according to claim 7, wherein the second degraded image is obtained by:
    down-sampling the original image with the magnification factor; and
    up-converting the down-sampled image with the magnification factor by the trained image upscaling system.

15. The method according to claim 7, wherein the value of the magnification factor is different in different training sets.

16. The method according to claim 7, wherein in the first training set, the original image is divided into a plurality of image blocks each having a first size; and
    in the second training set and the new training set, the original image is divided into a plurality of image blocks each having a second size.

17. A method for up-converting an image by the image upscaling system according to claim 1, comprising:
    generating, by the convolutional neural network module, a first number of feature images based on a received input image and a supplemental image of the same resolution as the input image, and outputting the first number of feature images to the synthesizer;
    synthesizing, by the synthesizer, every n*n feature images in the received feature image into one feature image, and outputting the synthesized feature images to the next convolutional neural network module; and
    generating, by the next convolutional neural network module, a second number of feature images based on the feature image outputted by the synthesizer and the supplementary image of the same resolution as the received feature image, and outputting the second number of feature images,
    wherein n denotes an upscaling magnification factor of the synthesizer, which is an integer greater than 1, and the number of feature images received by the synthesizer is a multiple of n*n.

18. The image upscaling system according to claim 2, wherein the upscaling magnification factor of the synthesizer is the same.

19. The display device according to claim 6, wherein the supplementary image is an image with a fixed distribution and white noise.

20. The display device according to claim 6, wherein the upscaling magnification factor of the synthesizer is the same.

* * * * *

UNITED STATES PATENT AND TRADEMARK OFFICE
CERTIFICATE OF CORRECTION

PATENT NO. : 10,311,547 B2
APPLICATION NO. : 15/741781
DATED : June 4, 2019
INVENTOR(S) : Pablo Navarrete Michelini It is certified that error appears in the above-identified patent and that said Letters Patent is hereby corrected as shown below:

On the Title Page

(72) Pablo Navarette Michelini should read: ---Pablo NAVARRETE MICHELINI---

Signed and Sealed this
Sixth Day of October, 2020

Andrei Iancu
*Director of the United States Patent and Trademark Office*